(12) United States Patent
Baumgartner (10) Patent No.: US 7,240,773 B2
(45) Date of Patent: Jul. 10, 2007

(54) DISC BRAKE WITH AN ADJUSTING SYSTEM

(75) Inventor: Johann Baumgartner, Moosburg (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 10/890,409

(22) Filed: Jul. 14, 2004

(65) Prior Publication Data

US 2005/0077126 A1    Apr. 14, 2005

Related U.S. Application Data

(63) Continuation of application No. PCT/EP03/00172, filed on Jan. 10, 2003.

(30) Foreign Application Priority Data

Jan. 14, 2002    (DE)    ................. 102 01 221

(51) Int. Cl.
    *F16D 65/56*    (2006.01)
(52) U.S. Cl. ..................... 188/71.9; 188/71.8
(58) Field of Classification Search ...... 188/71.7–71.9, 188/72.7–72.9, 72.3, 156–162
    See application file for complete search history.

(56) References Cited

U.S. PATENT DOCUMENTS

| 3,498,421 | A |   | 3/1970  | Ohmayer |           |
|-----------|---|---|---------|---------|-----------|
| 3,534,835 | A |   | 10/1970 | Meier   |           |
| 3,550,728 | A | * | 12/1970 | Rabich et al. | ............. 188/71.8 |
| 3,627,083 | A | * | 12/1971 | Seip et al.   | ................. 188/71.8 |
| 4,553,643 | A | * | 11/1985 | Wilcox        | ....................... 188/71.9 |
| 5,353,896 | A |   | 10/1994 | Baumgartner et al. | |
| 5,582,273 | A |   | 12/1996 | Baumgartner et al. | |
| 6,119,818 | A |   | 9/2000  | Krumbeck et al. | |
| 6,247,560 | B1 | * | 6/2001  | Bunker         | ..................... 188/18 A |
| 6,367,592 | B1 | * | 4/2002  | Kapaan et al.  | ............. 188/72.1 |
| 6,397,977 | B1 | * | 6/2002  | Ward           | ..................... 188/1.11 L |
| 6,666,308 | B1 | * | 12/2003 | De Vries et al. | ............ 188/157 |
| 6,837,342 | B1 | * | 1/2005  | Olschewski et al. | ....... 188/72.8 |

FOREIGN PATENT DOCUMENTS

| DE | 30 40 186 A1 | 6/1982 |
| DE | 36 10 569 A1 | 10/1987 |
| DE | 37 16 202 A1 | 11/1988 |
| DE | 198 10 685 C1 | 11/1999 |
| EP | 0 531 321 B1 | 8/1994 |
| EP | 0 688 404 B1 | 1/1997 |
| FR | 1 480 888 | 5/1967 |
| WO | WO 99/60285 | 11/1999 |

* cited by examiner

*Primary Examiner*—Chris Schwartz
(74) *Attorney, Agent, or Firm*—Crowell & Moring LLP (57) ABSTRACT

A disc brake, particularly for commercial vehicles, is provided having a caliper reaching over a brake disc, a brake application device arranged in the caliper for applying the brake, as well as an adjusting system arranged in the caliper for compensating brake pad and/or disc wear by adjusting the distance between the brake pad and the brake disc. The caliper has a two-part construction including an application-side caliper part and a reaction-side caliper part. The reaction-side caliper part is designed such that it frames the brake disc in its upper circumferential area. The adjusting system has at least one or more adjusting devices also arranged on the reaction side of the brake disc, and preferably on each side of the brake disc.

27 Claims, 7 Drawing Sheets

DISC BRAKE WITH AN ADJUSTING SYSTEM

BACKGROUND AND SUMMARY OF THE INVENTION

The invention relates to a disc brake particularly for commercial vehicles, having a caliper straddling a brake disc, an application device arranged in the caliper for applying the brake, as well as an adjusting system arranged in the caliper for compensating brake pad and/or disc wear by adjusting the distance between the brake pad and the brake disc, wherein the adjusting system has at least one adjusting device.

The invention particularly relates to novel constructions of disc brakes, particularly for commercial vehicles, which are operated pneumatically and/or electromechanically.

According to the selected force introduction principle, disc brakes can be divided into two basic constructions:

1. Generating of force and wear adjustment on both sides of the brake disc: for example, the hydraulic fixed-caliper disc brake with an axially fixed brake disc and the generating of force on both sides of the brake disc, as well as 2. Generating of force and wear adjustment on one side of the brake disc and transmission of the actuating power to the side which faces away, according to the reaction force principle: for example, the sliding-caliper disc brake, the hinged-caliper disc brake, and the fixed-caliper disc brake with a displaceable brake disc.

Pneumatically operated disc brakes for heavy commercial vehicles with rim diameters of 15 inches and more normally use the reaction force principle since, because of the narrow installation conditions at the vehicle wheel, the arrangement of a compressed-air brake actuating cylinder can be achieved only on the side of the vehicle wheel which is open toward the interior side of the vehicle. Constructions of this type are found, for example, in German Patent documents DE 36 10 569 A1 and DE 37 16 202 A1, and European Patent document EP 0 531 321 A1 (see here particularly the construction of the adjusters in the manner of rotary drives), and European Patent document EP 0 688 404 A1.

Sliding caliper or hinged caliper disc brakes require a component fixed to the axle—generally called a brake anchor plate—which holds or guides the chocks/brake pads and absorbs their circumferential forces when the brake is actuated and carries the caliper disposed in a displaceable manner coaxially with respect to the vehicle axle.

The relative movement, which the caliper carries out with respect to the component fixed to the axle, can be divided into the working stroke and the wear stroke. The invention surprisingly utilizes this effect.

The working stroke is carried out during each operation of the brake in order to overcome the release play of the brake and to compensate the elasticities of the brake pads and the caliper arising when force is applied. Depending upon the amount of the actuating power and the size of the release play, it normally amounts to <4 mm.

In contrast, the wear stroke is the wear adjusting path which the caliper carries out over a large number of brake operations in order to compensate for the wear at the reaction side of the brake. The wear stroke is composed of the wear of the brake pad situated on the outside and the brake disc friction surface situated on the outside and normally amounts to up to 25 mm.

In comparison, in the case of the brake construction having a fixed caliper and a displaceable brake disc, the working stroke and the wear stroke are generated by displacing the brake disc.

The constructions with the sliding caliper or the hinged caliper have the disadvantage that a brake anchor plate fixed to the axle is required for absorbing the circumferential force of the brake pads and the holding and guiding of the caliper. This component causes additional cost and weight. In addition, the required slide-guiding or swivelling system is susceptible to disturbances.

In contrast, the construction with the displaceable brake disc has the problem of keeping the brake disc on the guiding area of the hub freely slidable over the entire service life. Because of the narrow installation conditions and the harsh environmental stress, an effective sealing can hardly be implemented.

In light of this background, the present invention begins with the concept of mutually combining the advantages of the above-described caliper concepts, in which case an easy adaptability of the disc brake should exist to various application devices.

The invention achieves this task by providing a disc brake, particularly for commercial vehicles, having a caliper straddling a brake disc, an application device arranged in the caliper for applying the brake, as well as an adjusting system arranged in the caliper for compensating brake pad and/or disc wear by adjusting the distance between the brake pad and the brake disc, wherein the adjusting system has at least one adjusting device. The caliper has a two-part construction including application-side and reaction-side caliper parts. The reaction-side caliper part is designed such that it straddles the brake disc in its upper circumferential area. The adjusting system has at least one or more adjusting devices also on the reaction side of the brake disc, and preferably on each side of the brake disc.

Accordingly, the caliper is constructed in two parts, including an application-side and a reaction-side caliper part, the reaction-side caliper part being further developed such that it frames or straddles the brake disc in its upper circumferential area.

Furthermore, the adjusting system has at least one or more adjusting devices also on the reaction side of the brake disc, or adjusting devices are provided on each side of the brake disc.

Since at least one or two adjusting devices for the separate displacing of the brake pads on both side of the brake disc is/are provided on each side of the brake disc, the path to be bridged by the caliper can clearly be reduced when the caliper is designed as a sliding or hinged caliper.

In contrast, in the case of a design as a fixed caliper, the displacement path of the brake disc on the axle can clearly be reduced.

In the manner of a construction kit, the reaction-side caliper part can be combined with various application-side caliper parts, which each may have different application devices; thus, for example, an application device with an eccentrically disposed rotary lever in the interior of the caliper, or an application device with one or more ball screws.

This module-type construction permits an optimal adaptability of the brake to different applications.

The module system can also be used for the adaptation to different wheel sizes. However, in this case, the respectively identical application-side caliper part, i.e., the application device housing, is combined with different reaction-side caliper parts.

Figure 2:
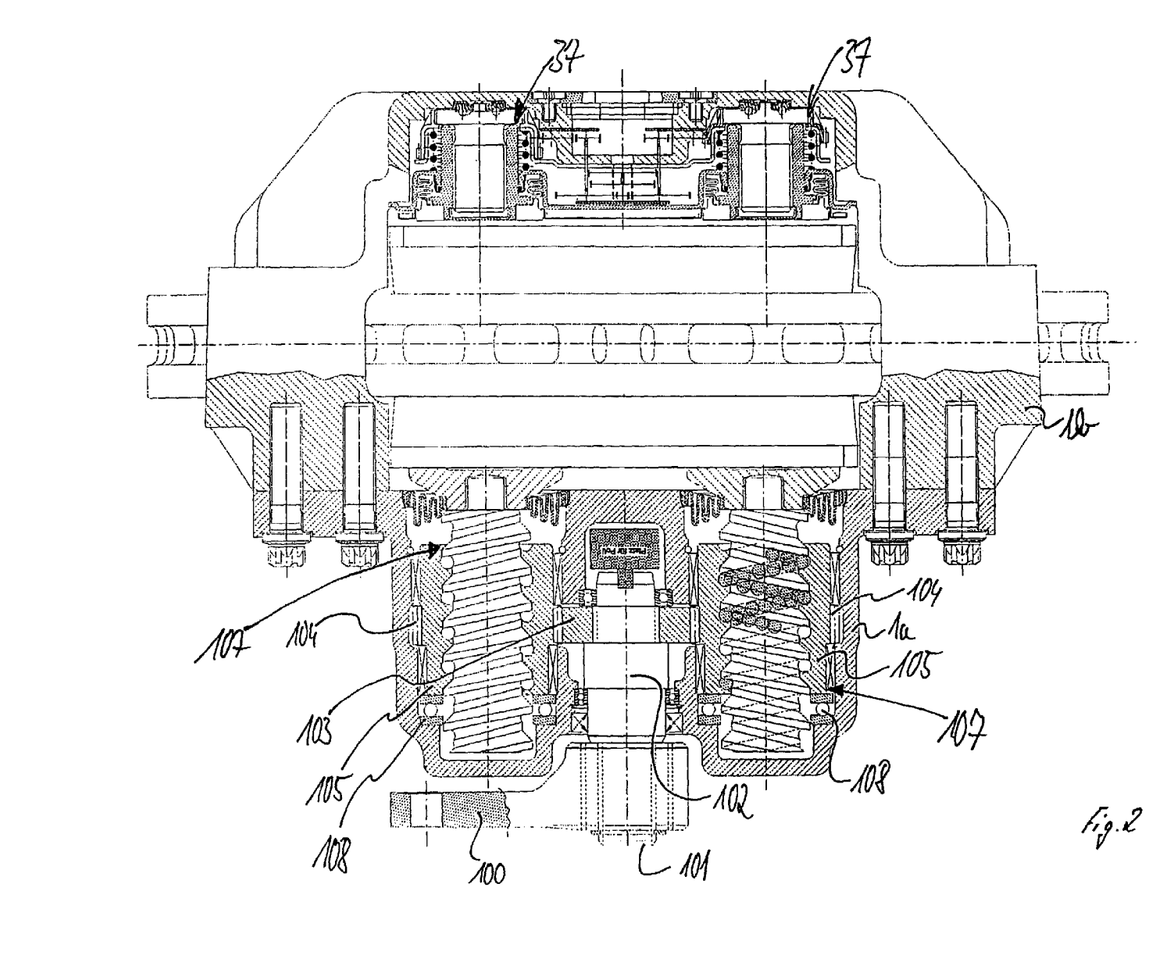
FIG. 2 is a partial sectional view of a second disc brake according to the invention.
Figure 3:
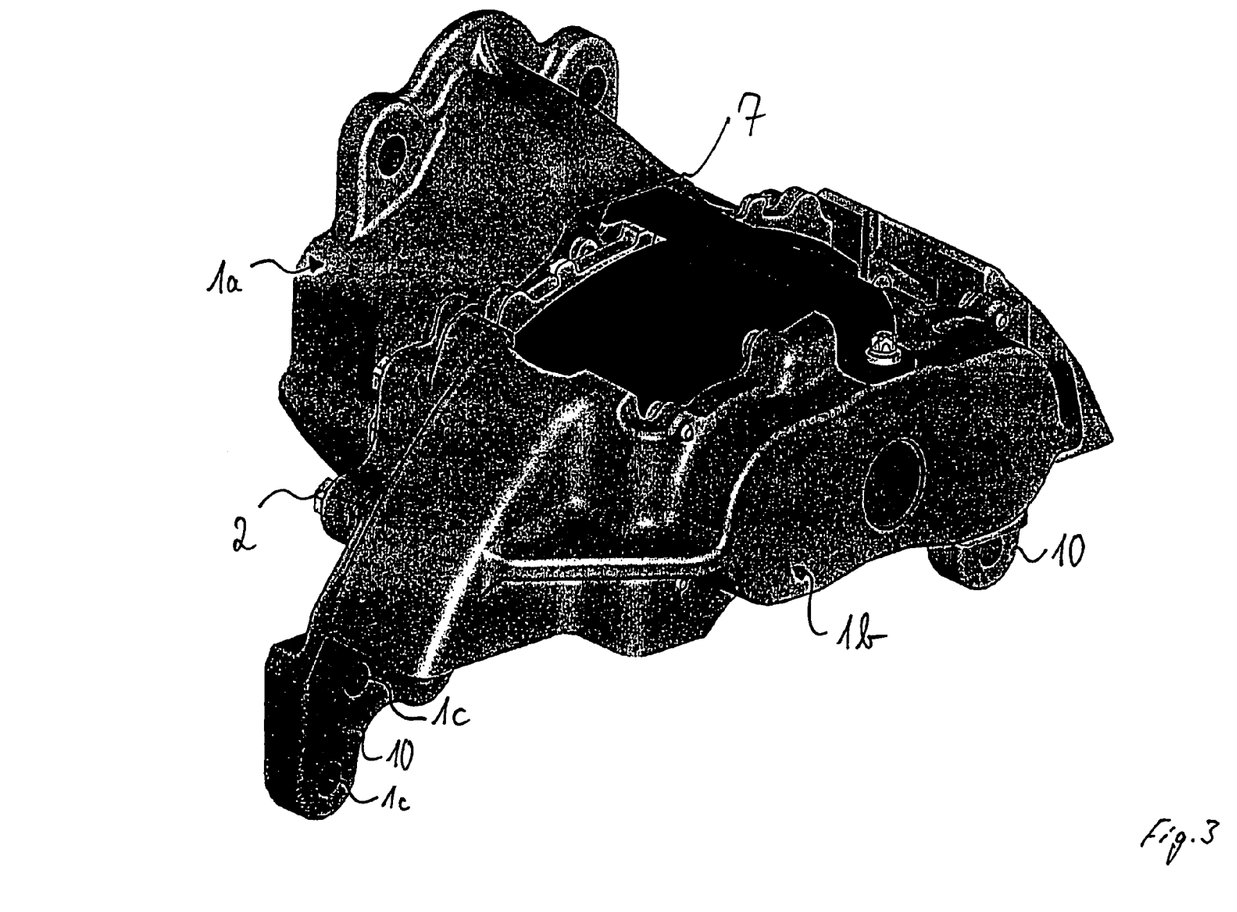
FIGS. 3–6 are various views of a two-part caliper.
Figure 4:
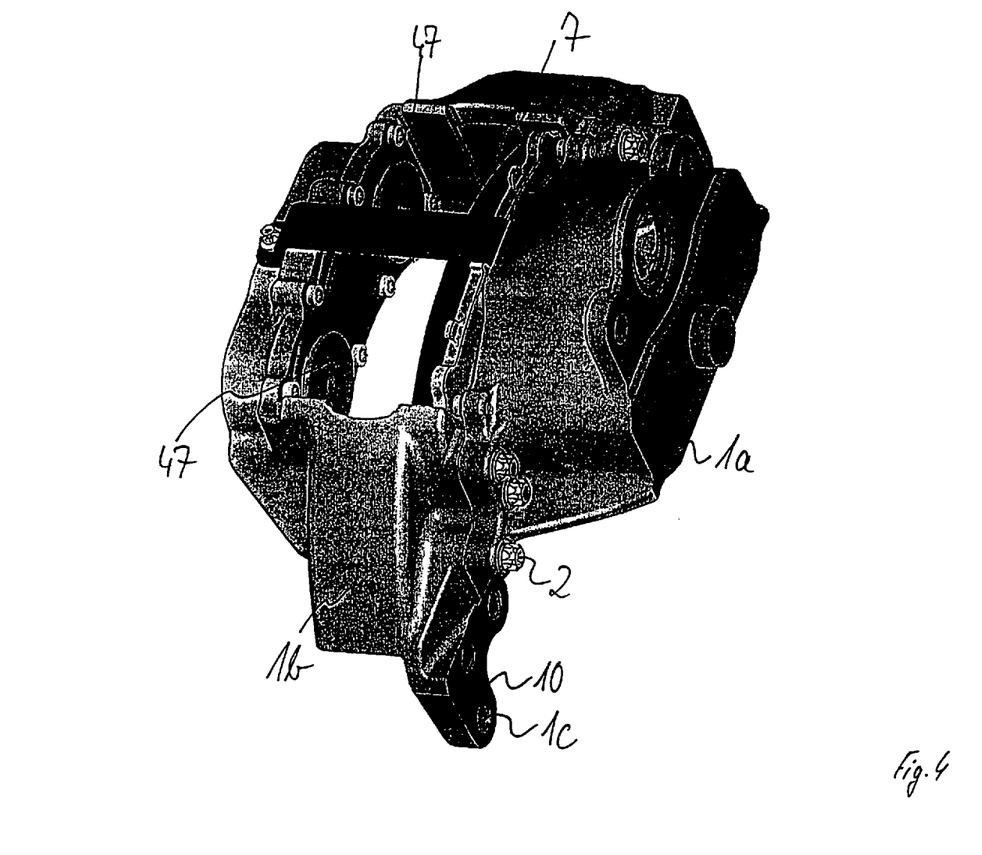
Figure 5:
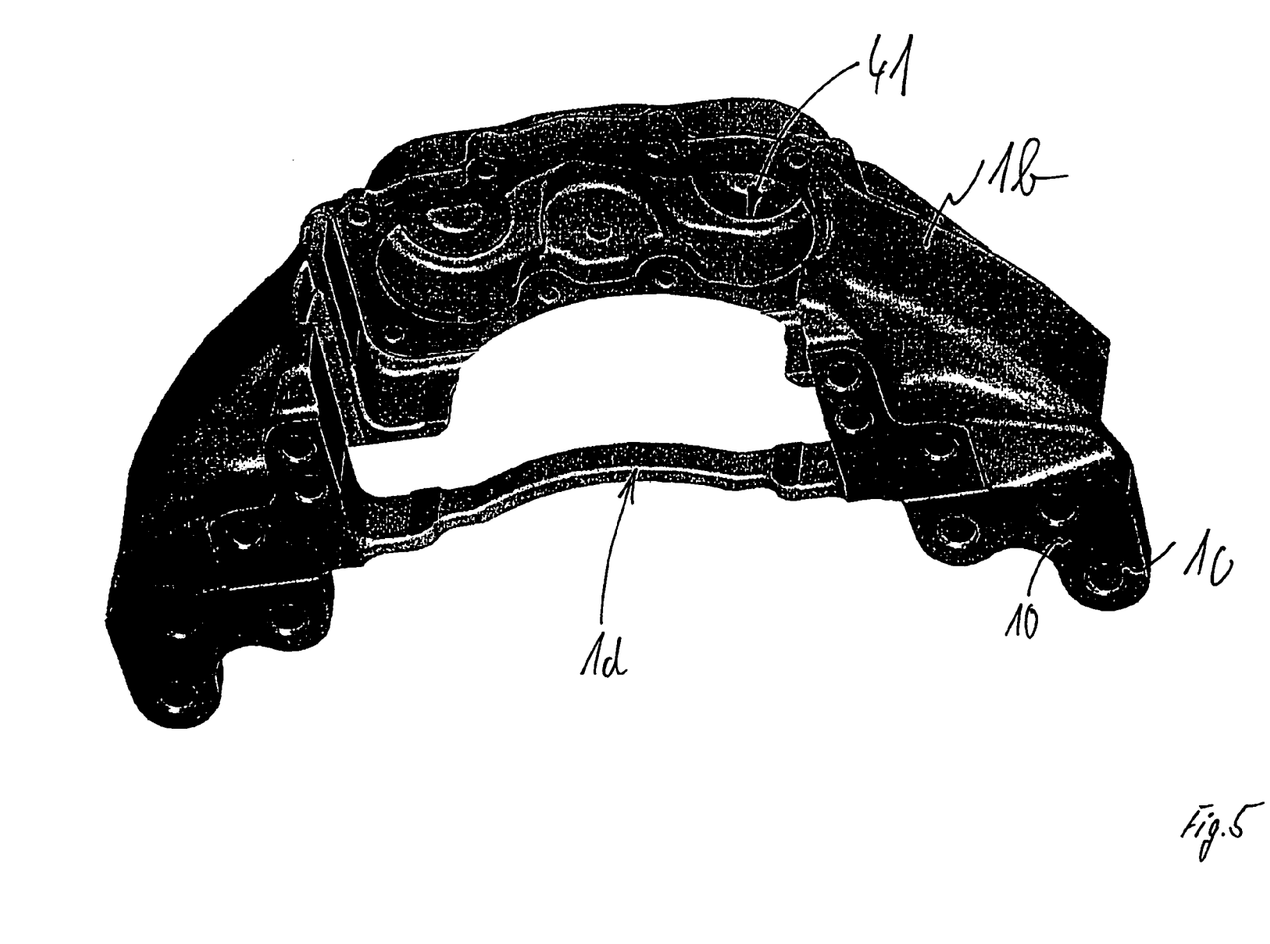
Figure 6:
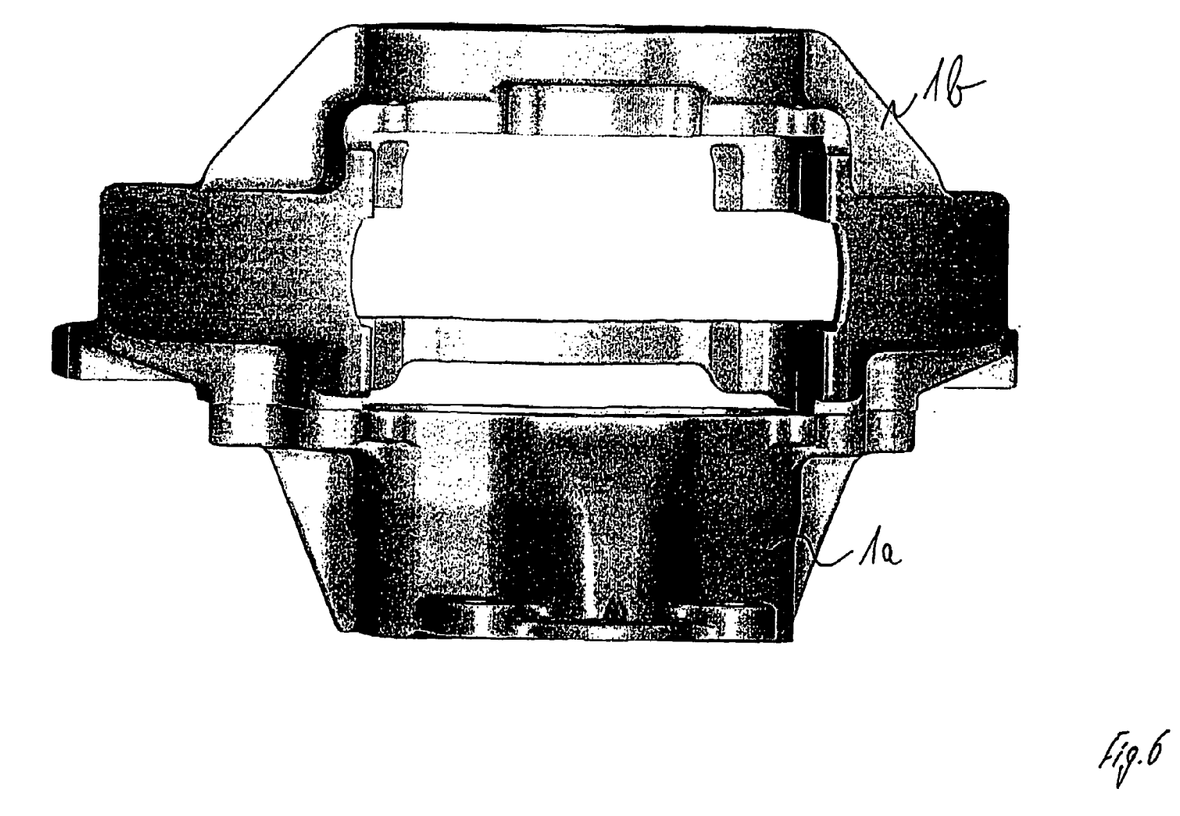

In the case of an application device having a threaded spindle system of the type shown in FIG. 2, the screw system itself also forms the application-side adjusting device, in which case the rotating movement required for the adjustment can, in each case, take place in a manner known per se from S-cam drum brakes by way of a compressed-air cylinder and a brake lever constructed as a slack adjuster or an electric-motor drive.

By means of the invention, a disc brake in particular can be implemented in the case of which the generating of the reaction force on the side of the brake facing away from the application device takes place by displacing the caliper and/or
swivelling the caliper and/or
displacing the brake disc,
deforming the caliper and/or the disc, and/or in which case, as a result of the displacing and/or swivelling and/or deforming movement, essentially only the path of half or the whole power stroke needs to be bridged.

The invention combines the advantages of the fixed-caliper principle, e.g. a compact construction and implementation of the wear stroke by the actuating system, with the advantages of the reaction force principle.

Alternatively or in addition, it is also contemplated that the reaction force generation on the side of the brake facing away from the application device side takes place by an elastic deforming of the caliper and/or of the brake disc and/or of another element, in which case essentially only the path of half or the whole power stroke needs to be bridged by the deformation. In this case, bearings of the brake disc or of the caliper can advantageously be further, or even completely, eliminated. Elastic brake discs are known per se; such as from German Patent document DE 198 10 685 A1.

By providing additional adjusting device(s) on both sides of the disc brake, it becomes possible to further develop the brake such that a mobility, (preferably a displaceability and/or a swivellability of the caliper and/or the brake disc) still only has to be ensured which is dimensioned such that the working stroke can be bridged during brakings in order to apply the brake. In this manner, the slide bearings and/or pivot bearings and guides can be dimensioned to be correspondingly smaller and more cost-effective. In addition, it is ensured that a smooth operation remains guaranteed along the entire sliding or swivelling path since the latter is bridged during virtually every braking.

The brake disc is preferably constructed as a sliding disc, which is displaceably guided on a brake disc hub such that, as a result of the displacement, a sliding path can be implemented which is limited maximally to the power stroke (depending on the design, the path which can be bridged by the displacing and/or swivelling movement of the caliper, in the case of a commercial vehicle brake, amounts to less than 4–6 mm or even less than 3 mm).

As an alternative or in addition, the caliper may be constructed as a sliding caliper which has a sliding caliper, bearing fastenable directly to the axle flange and which is dimensioned such that a sliding path can be bridged which is limited to the power stroke.

As an alternative or in addition, the caliper can be constructed as a hinged caliper, which has a hinged-caliper bearing, which preferably can be fastened directly to the axle flange and can be bridged with the swivelling angle which displaces the caliper relative to the brake disc essentially by the amount of the power stroke.

In particular, the disc brake according to the invention makes it possible to continue to arrange the power-generating device—such as a compressed-air-operated and/or electric-motor-operated brake cylinder or an electric drive—only on one side of the brake.

Additional advantages are achieved within the scope of the invention.

A variant of the invention solves the problem of the common adjusting of the adjusting rotary drives on both sides of the disc brake. In this case, the adjuster rotary drives on both sides of the brake disc are mutually coupled by a synchronization device. The synchronization device is, preferably, constructed as a coupling mechanism or as an electronic coupling system.

According to another embodiment, which can also be considered independently, the brake of the above-mentioned type is further developed in the caliper has a one- or two-part construction and, if it is constructed in two parts, has an application-side and a reaction-side caliper part. The reaction-side caliper part straddles the brake disc in its upper circumferential area. The adjusting system has at least one adjusting device on the reaction side of the brake disc. The brake application device has one or more ball screw(s). Here, a construction of the brake application device as a ball screw, and a micro-displaceable caliper and/or disc solution, are mutually combined with a reaction-side adjustment in a constructionally compact manner.

In this case, the caliper is constructed in one or two parts and, if it is constructed in two parts, has an application-side and a reaction-side caliper part. The reaction-side caliper part straddles the brake disc in its upper circumferential area. In addition, the adjusting system has at least one adjusting device on the reaction side of the brake disc, and the brake application device has one or more balls screw(s).

Additional advantageous embodiments of the invention are described and claimed herein.

BRIEF DESCRIPTION OF THE DRAWINGS

In the following, embodiments of the invention will be illustrated in detail with reference to the drawings.

DETAILED DESCRIPTION OF THE DRAWINGS

Figure 1:
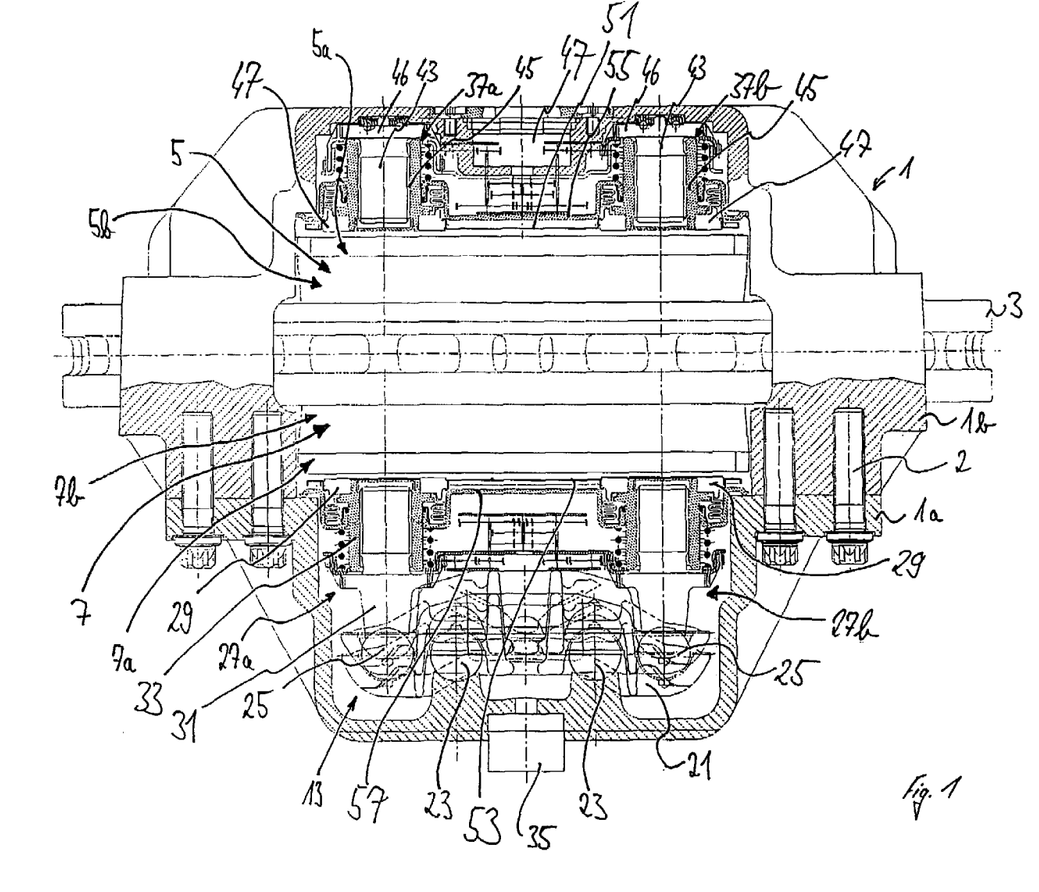
FIG. 1 is a partial sectional view of a first disc brake according to the invention.

FIG. 1 is a partial sectional view of a disc brake constructed in the manner of a module, which has a two part caliper 1 with caliper parts 1a, 1b which, as an example, are screwed to one another—in this case by using four illustrated bolts 2.

The caliper 1 straddles a brake disc 3 in its upper circumferential area.

On both sides of the brake disc 3, brake pads 5, 7 are arranged, which pads can be displaced in the direction of the brake disc (and away from the brake disc) that is, perpendicularly to the plane of the brake disc 3. The brake pads 5, 7 normally consist of a brake pad carrier 5a, 7a and the pad material 5b, 7b applied thereto.

The contact surface between the two caliper parts 1a, 1b is situated offset laterally to the plane of the brake disc 3 such that one of the two caliper parts, i.e., the reaction-side caliper part 1b (which is at the top in FIG. 1), itself forms a frame which completely straddles the brake disc 3 in its upper circumferential area such that the brake pads 5 and 7 on both sides of the brake disc are also accommodated in a shaft-type manner by the reaction-side caliper part 1b.

In contrast, the application side caliper part 1a is designed such that it essentially accommodates the brake application device 13, which is used for converting the movement of a preferably pneumatic or of an electromechanical drive to an application movement of the application-side brake pad 7.

As a result of this further development of the caliper 1, the reaction-side caliper part 1b, as an "equal part", can be combined in a module-type manner with many different application devices without having to be changed with respect to its construction.

The caliper 1 can be designed as a fixed caliper. In this case, the brake disc is constructed as a disc which is displaceable on the hub of the vehicle and/or is elastic itself. This is illustrated in principle in FIG. 7 which, however, as an example, shows a one-part caliper 1 and is only used for illustrating the sliding disc principle.

The caliper 1 (or one of the caliper parts), particularly the reaction-side caliper part 1b, can be fastened in the manner of FIGS. 3 to 6, in its lower section (see also FIG. 7) at lower extensions 10 with bores 1c by way of at least one or more bolts 9 either directly to an axle flange 11 of the vehicle axle (otherwise not shown here) or, by way of an intermediate flange (not illustrated here) to the axle flange 11.

The caliper 1 cannot be displaced relative to the axle flange 11. It is therefore a so-called fixed caliper. Since the caliper 1 cannot be displaced relative to the axle flange 11, it requires, in addition to an application device 13 on one side of the brake disc 3, in each case separate adjusting devices on both sides of the brake disc, which adjusting devices compensate for the brake pad wear.

Figure 7:
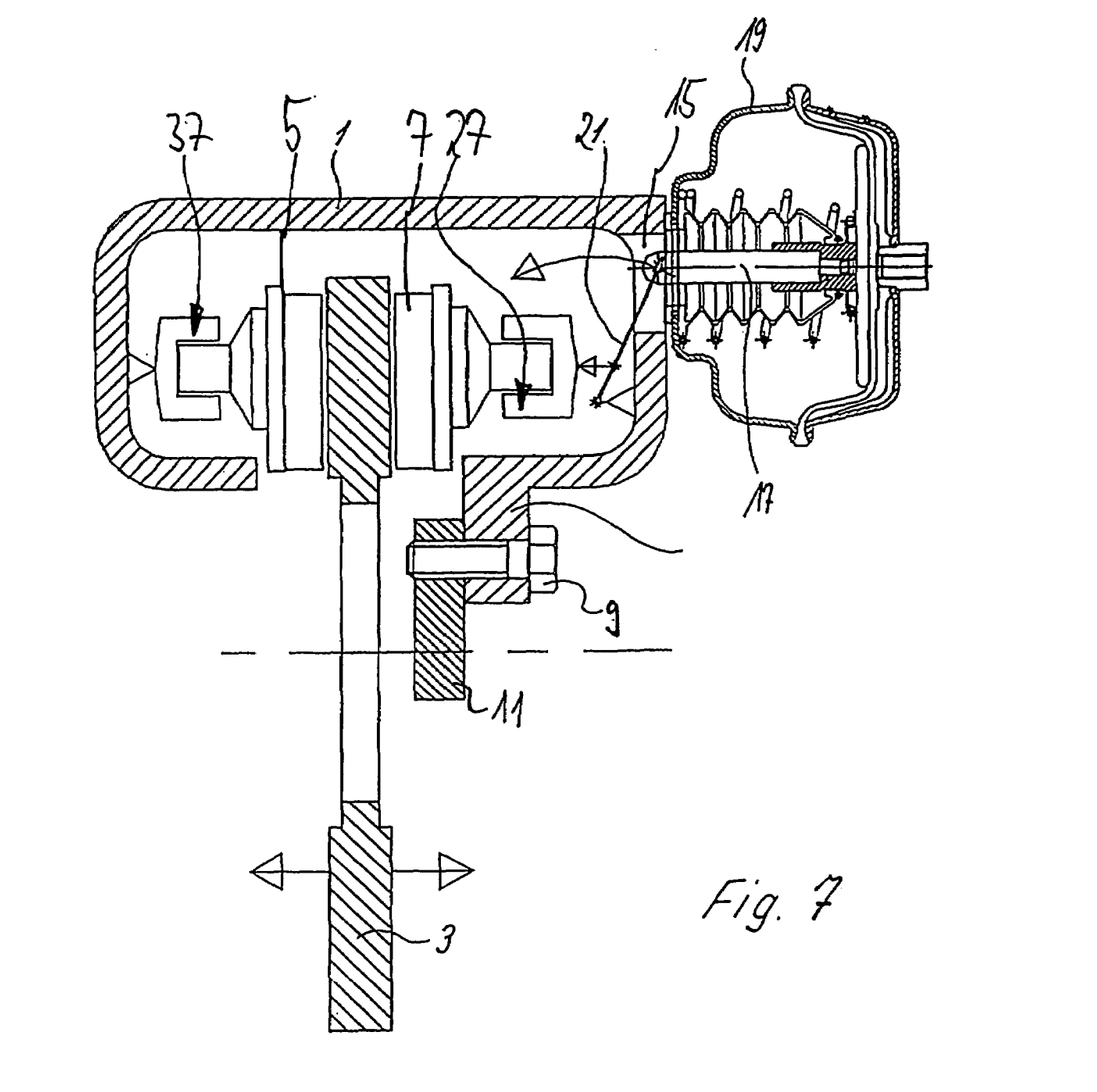
FIG. 7 is a sectional view of a schematic representation of another disc brake.

On its right side (see the illustration of FIG. 7), the application-side caliper part 1a or the one-part caliper 1 of FIG. 7 has an opening 15 for a piston rod 17 of a (preferably pneumatic) brake cylinder 19 or of an electromechanical driving device.

The piston rod 17 acts upon a traverse-type rotary lever 21 which is disposed, preferably eccentrically, at the caliper 1. The rotary lever 21 is shown in FIG. 1 in several operating positions and is supported by way of two ball elements 23 at the interior of the application-side caliper part 1a. On its side facing away from the caliper 1, the lever 21 has two additional ball elements 25, which are arranged to be laterally offset toward the outside with respect to the first ball elements 23.

These additional ball elements 25 act upon two mutually parallel screw spindle arrangements 27a, 27b at whose ends facing the brake disc, pressure pieces 29 are in each case arranged which act upon the brake pad 7.

When the brake is applied, the rotary lever 21 is swivelled, which rotary lever 21 is eccentrically disposed/constructed such that, when it is swivelled, it advances the screw arrangements 27a, b in the direction of the brake disc until the brake pads press against the brake disc 3.

For implementing the wear-caused adjustment, the screw arrangements 27a, b can be varied in their length perpendicular to the brake disc 3. This is implemented in that they consist of a bolt 31 and a sleeve 33, which is axially adjustable on the bolt 31 by means of screwing, the sleeves 31 carrying the pressure pieces here. A reverse arrangement is also possible.

The sleeves 33 or the bolts 31 are driven by an electric motor 35 arranged on the exterior side of the caliper, which electric motor 35 acts by way of a driving connection and gearwheels (not shown here in detail) upon the externally toothed sleeves 33 or bolts 31.

For readjusting the brake pad, for example, one or more return springs can be used.

Since the caliper 1 is arranged to be fixed and not movable relative to the vehicle axle, another adjusting device is provided on the side of the brake disc 3 opposite the brake application device 13 in the caliper; that is, here also, two mutually parallel screw arrangements 37a, b aligned perpendicular to the brake disc are provided. The screw arrangements 37a, b are driven electromotively by an electric motor arranged at/in the reaction-side part and again each have a bolt 43 and a sleeve 45 which can be axially adjusted thereon by screwing, which carry the pressure pieces 47 which act upon the application-side brake pad 5.

The screw arrangements 37a, b can also be changed in their length perpendicular to the brake disc 3 for implementing the wear-caused adjustment. In their area facing away from the brake disc, they are each supported directly or by way of a disc 46 on the interior side of the caliper part 1b, which has a recess 41 for the adjusting device.

As an alternative to the rotary adjusting devices, pistons or other devices which can change their position can also be implemented.

Since the caliper has a brake application device 13 only on one side of the brake disc 3, in which case the generating of the reaction force takes place on the side of the brake facing away from the brake application device, here by displacing the brake disc 3, the wear adjustment on the reaction side, however, is not implemented according to the state of the art by displacing or swivelling the caliper or displacing the brake disc, but rather by the adjusting devices integrated in the caliper on the reaction side in the form of screw arrangements in addition to the electric drive with the electric motor 47 on the interior side of the reaction-side caliper part 1b and a transmission 49 between the electric motor 47 and the screw arrangements 37.

Cover plates 51, 53 close off the caliper parts 1a, 1b on both sides of the brake disc with the exception of openings for the pressure pieces. Mounting plates 55, 57 permit a module-type preassembly of the adjusting devices on both sides of the brake disc 3.

It is also contemplated to achieve the generating of the reaction force by an elastic deformation of the caliper, of the brake disc and/or of a separate element.

In addition to a clear reduction of weight and cost as a result of the elimination of the brake anchor plate and of the slide guiding system of a sliding caliper, as well as an increase in the sturdiness of the brake because of the elimination of these components, the thus constructed disc brakes have the additional advantage that, because of the forced wear adjustment, a non-uniform wear of the inner and outer brake pad can be influenced more effectively.

Another important advantage of these variants is the fact that the sliding or swivelling path to be carried out here by the brake disc is limited to the power stroke required for the application of the reaction force, which power stroke amounts to only a small fraction of the wear stroke; that is, the required power stroke of a pneumatically operated disc brake for 22-inch wheels amounts to approximately 4 mm, while the wear stroke amounts to approximately 25 mm.

A disc brake is also contemplated which has a caliper bearing and a displaceable brake disc and which can be displaced by approximately half the working stroke. This embodiment is also provided with separate adjusting devices on both sides of the brake disc.

It should be noted that the invention is suitable for disc brakes, particularly commercial vehicle disc brakes of many different types. Thus, the idea of providing adjusting devices on both sides of the brake disc can be implemented in the case of brakes which can be applied by an electric motor as well as pneumatically actuated brakes. Further, the adjusting devices can be coupled with the application device(s) on one or both sides of the brake disc with respect to the drive and/or may be equipped with one or more separate electromagnetic drive(s) independently of the application devices. Mixed constructions are also contemplated here; for example, with an adjusting device with the electric motor on the reaction side and with an adjusting device mechanically coupled with the rotary lever on the side of the application device.

It is also contemplated to adjust the adjusting rotary devices on both sides of the brake disc 3 by means of a computer control and/or microprocessor control separately from one another, or to carry out a mechanical coupling of the adjusting devices on both sides of the brake disc 3 for achieving a common adjustment.

The forced readjustment of the respective slidable or swivellable element—caliper or brake disc—by elastic readjusting elements (for example, readjusting spring(s)) or the active readjusting by the reaction-side adjuster module is contemplated.

The invention is also suitable for brakes with only a single adjusting drive on each side of the brake disc, as well as for embodiments with two, or even more, adjusting drives on each side of the adjusting device.

The construction of the caliper is also important. As a result of the fact that the caliper part 1b which frames the brake disc has only one or two adjusting device(s) but no application device, it becomes possible to vary particularly the additional caliper part in the manner of a construction kit and module.

Thus, although in FIG. 2 a reaction-side caliper part 1b is used which with respect to its construction is identical with FIG. 1 and also has the adjusting device of FIG. 1, the application-side caliper part 1a has an application device 13 which is completely different from FIG. 1.

Here, a rotary lever 100, which can be moved by the piston rod of a brake cylinder on the exterior side of the caliper 1 acts upon a shaft 101 penetrating the caliper 1 with an adjusting device 102 (which is not shown here in detail).

The shaft 101 carries a gearwheel 103 which meshes with teeth 104 on both sides which are arranged at the outer circumference of threaded nuts 105 into which the threaded spindles 106 are screwed, which are part of two mutually parallel ball screws 107 aligned perpendicular to the brake disc 3. The threaded nuts 104 are disposed by means of bearings on the interior of the caliper.

During braking operations, the rotary lever 100 is swivelled, which causes the shaft 101 and thus the threaded nuts 105 to rotate along, so that the threaded spindles (screws) 106 are axially advanced in the direction of the application-side brake pad 7 and press the brake pads 7 against the brake disc 3.

The profile between the threaded nut 105 and the threaded spindle 106 is, in each case, constructed as a saw-tooth profile on which the balls run, which ensures a high loading capacity in the pressure direction. Thus, the ball races are constructed similar to an angular ball bearing. This construction ensures an increased axial bearing capacity; however, other profile shapes are also possible.

The caliper can again be designed as a fixed caliper, or as one of the other initially mentioned designs, so that the adjusting option arranged on the reaction side again proves to be extremely advantageous.

In a supplementary manner, FIGS. 3 to 6 show the caliper geometry. The frame 1d formed by the caliper part 1b is particularly easily visible, for example in FIG. 5. The caliper part 1b has the frame 1d, which is adjoined by a section for receiving the reaction-side adjusting device, which section comprises the recess 41. Struts of the caliper part 1b on all sides of the brake disc 3 are connected with one another in one piece for forming the frame 1d. These struts also form the receiving devices or pad shafts for the two brake pads.

| Table of Reference Numbers | |
|---|---|
| caliper | 1 |
| caliper parts | 1a, 1b |
| frame | 1d |
| bolt | 2 |
| brake disc | 3 |
| brake pads | 5, 7 |
| brake pad supports | 5a, 7a |
| pad material | 5b, 7b |
| bolt | 9 |
| axle flange | 11 |
| brake application device | 13 |
| opening | 15 |
| piston rod | 17 |
| brake cylinder | 19 |
| rotary lever | 21 |
| ball elements | 23 |
| ball elements | 25 |
| screw arrangements | 27a, b |
| pressure pieces | 29 |
| bolts | 31 |
| sleeve | 33 |
| electric motor | 35 |
| screw arrangements | 37a, b |
| recess | 41 |
| bolt | 43 |
| sleeves | 45 |
| discs | 46 |
| electric motor | 47 |
| transmission | 49 |
| covering plates | 51, 53 |
| mounting plates | 55, 57 |
| rotary lever | 100 |
| shaft | 101 |
| adjusting device | 102 |
| gearwheel | 103 |
| toothing | 104 |
| threaded nut | 105 |
| threaded spindle (screw) | 106 |
| ball screw | 107 |
| bearing | 108 |

The invention claimed is:

1. A disc brake for a commercial vehicle having a brake disc, the disc brake comprising:
    a caliper configured to straddle the brake disc in an upper circumferential area thereof, the caliper having a two-part construction including an application-side caliper part and a reaction-side caliper part, said reaction-side caliper part accommodating two brake pads, one on each side of the brake disc;
    a pneumatically or electro-mechanically actuated brake application device arranged only in the application-side caliper part for applying a braking force; and
    an adjusting system for compensating at least one of brake pad wear and brake disc wear by adjusting a distance between the brake pad and the brake disc, the adjusting system having at least one or more adjusting devices arranged in the reaction-side caliper part, wherein a reaction force generated on the side of the brake disc facing away from the brake application device occurs by at least one of displacing the caliper, swiveling the caliper and displacing the brake disc, and the displacing and/or swiveling movement is limited to essentially a working stroke of the brake.

2. The disc brake according to claim 1, wherein said at least one or more adjusting devices are arranged in the caliper on each side of the brake disc.

3. The disc brake according to claim 2, wherein the adjusting devices are rotary drives mutually coupled on both sides of the brake disc by a synchronization device.

4. The disc brake according to claim 3, wherein the synchronization device is one of a coupling mechanism or an electronic coupling system.

5. The disc brake according to claim 2, wherein the reaction-side caliper part accommodates the at least one reaction-side adjusting device in a recess.

6. The disc brake according to claim 2, wherein the brake disc is a sliding disc displaceably guided on a brake disc hub such that, as a result of a displacement, a sliding path can be implemented which is essentially limited to half the power stroke or the whole power stroke.

7. The disc brake according to claim 2, wherein the caliper is a sliding caliper, which:
has a sliding caliper bearing,
is fastenable directly to an axle flange, and
is dimensioned such that a sliding path can be bridged which is limited to half the power stroke or the whole power stroke.

8. The disc brake according to claim 2, wherein the adjusting device on one and/or both sides of the brake disc have screw arrangements that are changeable in their length perpendicular to the brake disc and each comprise a bolt and a sleeve screwed thereon.

9. The disc brake according to claim 1, wherein the reaction-side caliper part accommodates the at least one reaction-side adjusting device in a recess.

10. The disc brake according to claim 1, wherein the reaction-side caliper part is operatively fastenable via extensions with one or more bolts directly to one of an axle flange and a brake anchor plate.

11. The disc brake according to claim 1, wherein the brake disc is a sliding disc displaceably guided on a brake disc hub such that, as a result of a displacement, a sliding path can be implemented which is essentially limited to half the power stroke or the whole power stroke.

12. The disc brake according to claim 1, wherein the caliper is a sliding caliper, which:
has a sliding caliper bearing,
is fastenable directly to an axle flange, and
is dimensioned such that a sliding path can be bridged which is limited to half the power stroke or the whole power stroke.

13. The disc brake according to claim 1, wherein the brake application device has a rotary lever, which is eccentrically disposed at the caliper and which is supported by way of ball elements at an interior of the application-side caliper part, the rotary lever having additional ball elements also on its side facing away from the caliper, which additional ball elements comprise two mutually parallel screw arrangements at whose ends facing the brake disc, pressure pieces are in each case arranged which act upon an application-side brake pad.

14. The disc brake according to claim 1, wherein the adjusting system, also on one or both sides of the brake disc, has an adjuster drive, which is constructed as one of an electric motor and a mechanical coupling to the brake application device.

15. The disc brake according to claim 1, wherein the adjusting system on one or both sides of the brake disc is constructed as an adjuster module capable of preassembly.

16. The disc brake according to claim 1, wherein the adjusting system on one or both sides of the brake disc is constructed as an adjuster module capable of preassembly.

17. A disc brake for a commercial vehicle having a brake disc, the disc brake comprising:
a caliper having an application-side and a reaction-side, wherein the reaction-side straddles the brake disc in an upper circumferential area thereof and accommodating two brake pads, one on each side of the brake disc;
an adjusting system having at least one adjusting device arranged in the reaction-side of the caliper on a reaction side of the brake disc; and
a brake application device arranged in the application-side of the caliper, the brake application device having at least one ball screw and being actuated either pneumatically or electro-mechanically,
wherein a reaction force generated on the side of the brake disc facing away from the brake application device occurs by at least one of displacing the caliper, swiveling the caliper and displacing the brake disc, and the displacing and/or swiveling is limited to essentially a working stroke of the brake.

18. The disc brake according to claim 17, wherein the brake application device includes a rotary lever arranged on an exterior side of the caliper that acts upon a shaft penetrating the caliper, the shaft having an integrated adjusting device.

19. The disc brake according to claim 18, wherein the shaft carries a gearwheel which meshes with teeth on both sides which are arranged at an outer circumference of threaded nuts into which threaded spindles are screwed, which spindles are part of two mutually parallel ball screws aligned perpendicular to the brake disc, the threaded nuts being disposed via bearings on an interior of the caliper.

20. The disc brake according to claim 19, wherein for the ball screws of the brake application device, a profile between a threaded nut and a threaded spindle is in each case constructed as a saw-tooth profile on which balls run.

21. The disc brake according to claim 17, wherein for the ball screws of the brake application device, a profile between a threaded nut and a threaded spindle is in each case constructed as a saw-tooth profile on which balls run.

22. The disc brake according to claim 17, wherein the reaction-side and the application-side of the caliper are formed of separate parts.

23. The disc brake according to claim 17, wherein the reaction-side and the application-side of the caliper are formed in one piece.

24. A disc brake for a commercial vehicle having a brake disc, the disc brake comprising:
a caliper configured to straddle the brake disc in an upper circumferential area thereof, the caliper having a two-part construction including an application-side caliper part and a reaction-side caliper part, said reaction-side caliper part accommodating two brake pads, one on each side of the brake disc;
a pneumatically or electro-mechanically actuated brake application device arranged only in the application-side caliper part for applying a braking force; and
an adjusting system for compensating at least one of brake pad wear and brake disc wear by adjusting a distance between the brake pad and the brake disc, the adjusting system having at least one or more adjusting devices arranged in the reaction-side caliper part, wherein a reaction force generated on the side of the brake disc facing away from the brake application device side occurs by an elastic deforming of at least one of the caliper, the brake disc, and another element arranged between the caliper and an axle flange.

25. A disc brake for a commercial vehicle having a brake disc, the disc brake comprising:

a caliper configured to straddle the brake disc in an upper circumferential area thereof, the caliper having a two-part construction including an application-side caliper part and a reaction-side caliper part, said reaction-side caliper part accommodating two brake pads, one on each side of the brake disc;

a pneumatically or electro-mechanically actuated brake application device arranged only in the application-side caliper part for applying a braking force; and an adjusting system for compensating at least one of brake pad wear and brake disc wear by adjusting a distance between the brake pad and the brake disc, the adjusting system having at least one or more adjusting devices arranged in the reaction-side caliper part, wherein said at least one or more adjusting devices are arranged in the caliper on each side of the brake disc, and a reaction force generated on the side of the brake disc facing away from the brake application device side occurs by an elastic deforming of at least one of the caliper, the brake disc, and another element arranged between the caliper and an axle flange.

26. A disc brake for a commercial vehicle having a brake disc, the disc brake comprising:

a caliper configured to straddle the brake disc in an upper circumferential area thereof, the caliper having a two-part construction including an application-side caliper part and a reaction-side caliper part;

a pneumatically or electro-mechanically actuated brake application device arranged only in the application-side caliper part for applying a braking force; and an adjusting system for compensating at least one of brake pad wear and brake disc wear by adjusting a distance between the brake pad and the brake disc, the adjusting system having at least one or more adjusting devices arranged in the reaction-side caliper part, wherein a reaction force generated on the side of the brake disc facing away from the brake application device occurs by at least one of displacing the caliper, swiveling the caliper and displacing the brake disc, and the displacing and/or swiveling movement is limited to essentially a working stroke of the brake, and wherein the caliper is a hinged caliper, which:

has a hinged-caliper bearing, is fastenable directly to an axle flange, and by which, a swivelling angle can be bridged which displaces the caliper relative to the brake disc essentially by the amount of half the power stroke or the whole power stroke.

27. A disc brake for a commercial vehicle having a brake disc, the disc brake comprising:

a caliper configured to straddle the brake disc in an upper circumferential area thereof, the caliper having a two-part construction including an application-side caliper part and a reaction-side caliper part;

a pneumatically or electro-mechanically actuated brake application device arranged only in the application-side caliper part for applying a braking force; and an adjusting system for compensating at least one of brake pad wear and brake disc wear by adjusting a distance between the brake pad and the brake disc, the adjusting system having at least one or more adjusting devices arranged in the reaction-side caliper part, wherein a reaction force generated on the side of the brake disc facing away from the brake application device occurs by at least one of displacing the caliper, swiveling the caliper and displacing the brake disc, and the displacing and/or swiveling movement is limited to essentially a working stroke of the brake, and wherein the caliper is a hinged caliper, which:

has a hinged-caliper bearing, is fastenable directly to an axle flange, and by which, a swivelling angle can be bridged which displaces the caliper relative to the brake disc essentially by the amount of half the power stroke or the whole power stroke.

* * * * *